United States Patent [19]
Denton

[11] 3,858,160
[45] Dec. 31, 1974

[54] APPLIANCE STRAIN RELIEF

[75] Inventor: Bryce A. Denton, Ontario, Calif.

[73] Assignee: General Electric Company, Bridgeport, Conn.

[22] Filed: Mar. 5, 1973

[21] Appl. No.: 338,154

[52] U.S. Cl.................. 339/107, 339/101, 174/135
[51] Int. Cl........................................... H01r 13/58
[58] Field of Search........... 339/101, 103, 104, 105, 339/106, 107; 174/135 X

[56] References Cited
UNITED STATES PATENTS

| | | | |
|---|---|---|---|
| 2,128,883 | 8/1938 | Burt | 339/107 |
| 3,020,518 | 2/1962 | Camping et al. | 339/107 |
| 3,573,714 | 4/1971 | Turner | 339/101 |

FOREIGN PATENTS OR APPLICATIONS

| | | | |
|---|---|---|---|
| 6,509,622 | 7/1965 | Netherlands | 174/135 |

Primary Examiner—Roy D. Frazier
Assistant Examiner—Robert A. Hafer
Attorney, Agent, or Firm—John F. Cullen; George R. Powers; Leonard J. Platt

[57] ABSTRACT

A strain relief mechanism for use in a portable electric appliance that has separated cord conductors connected to internal appliance terminals. An improved strain relief connection between the cord and appliance is provided comprising a generally U-shaped housing chamber to contain the conductors, the chamber having a central fastening hole and a step portion coextensive with and spanning the chamber adjacent the hole. A chamber cover is provided having a tongue extending toward the step portion and coextensive with the step portion. A protected recess is disposed in the cover with screw means engaging the hole fastening the cover to the housing. The recess is deep so the screw means cannot be contacted by the user's finger. The parts are formed so the separate conductors straddle the screw means anywhere in the chamber and the tongue automatically positions the conductors in proper strain relief anywhere along the step while also blocking the external cord from entering the chamber when the cover is tightened. Disposition of the various parts provide maximum fastening force and ensure proper strain relief and form cover guide means.

7 Claims, 4 Drawing Figures 3,858,160
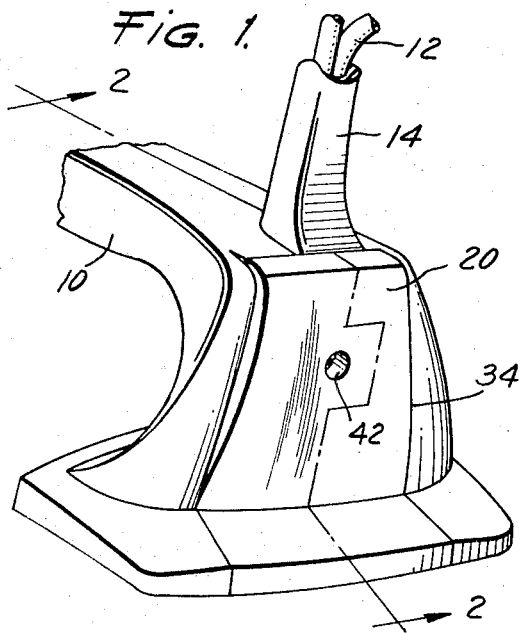
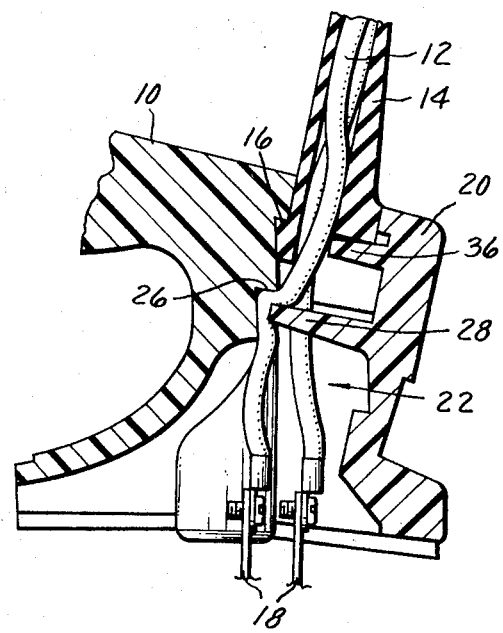
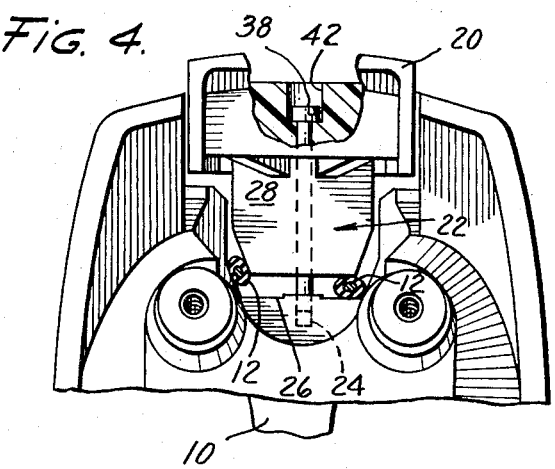
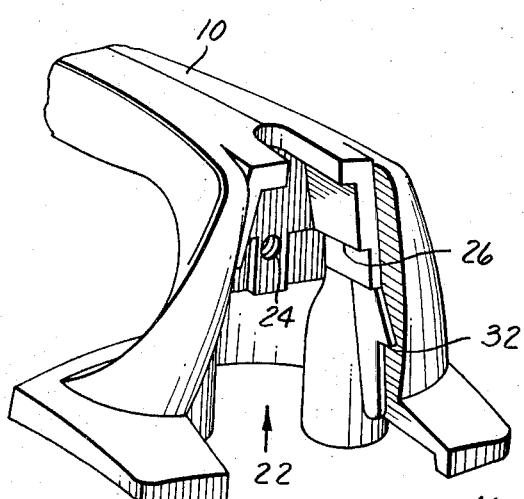
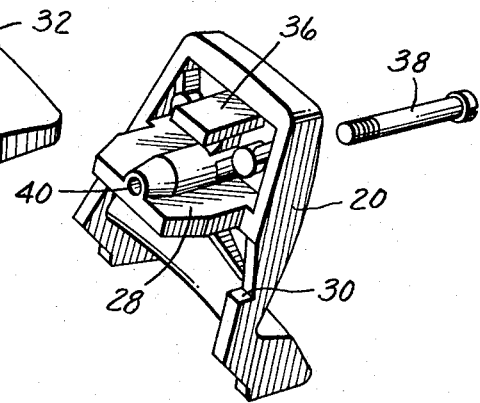

APPLIANCE STRAIN RELIEF

BACKGROUND OF THE INVENTION

1. Field of the Invention

This invention relates to a strain relief for an electric appliance, the strain relief being molded plastic and in which the various parts perform multiple functions reducing the number of parts required.

2. Description of the Prior Art

Many portable electric appliances today are cord operated as opposed to battery operated. The cords are of various materials and, depending upon the particular appliance, different amounts of cord flexing occur in use. Additionally, the appliance may be unintentionally suspended by the cord or the cord may be pulled putting a strain on it at its connection with the appliance. In time, these actions may expose or break internal conductors resulting in possible shorts. Additionally, some appliances, such as irons, subject the cords to higher temperatures. Under all circumstances it is undesirable to transmit stress through the cord to the appliance terminals for obvious reasons. It is common to provide various forms of strain relief such as knots, clamps, or plates to permit slack in the conductors in the appliance to relieve stress on the terminals. Additionally, in electrical appliances, various parameters must be met to qualify for Underwriters' Laboratory Inc. approval. The cord may last the life of the appliance but it is desirable that it be easily replaceable by the owner and still be as serviceable as the original. While such cords and requirements vary, depending on the appliance, a typical appliance that subjects a cord to stringent conditions is the electric flatiron and it is to this that the invention is directed for pusposes of description although it is by no means so limited. Traditionally, the cord for supplying current to the heating element of a flatiron is known in the industry as heater parallel twisted conductors better known as HPD heater cord. This consists of two multi-strand conductors each overlaid with cotton thread followed by uncured rubber and then asbestos fiber. The conductors are twisted together and overlaid with a braided cotton outer layer. This approved cord is flexible, long life, and slides easily over the material being ironed and the end connected to the terminals withstands the high temperatures involved. The cord may scorch if the iron contacts the braid for a short time and consequently becomes weakened to eventually expose the conductors with consequent danger. Also, repeated flexing of the cord in use may eventually result in breaking of the conductors with this type of heater cord.

A later development of cord used on appliances is heater parallel neoprene or HPN heater cord and this involves two multi-strand conductors, each coated with tin or covered with a layer of material such as cotton thread or paper ribbon which are then coated with an insulating material such as neoprene rubber by extrusion of the rubber and conductors through a die while the conductors are separated so the extruded rubber holds the conductors apart and acts as insulation between them and provides an outer covering. A flat extrusion may include a connecting web, like the well-known lamp cord, so the conductors can be ripped easily to separate them for connection to the terminals. Neoprene-covered HPN heater cord has not been suitable for flatirons because it does not slide easily over the material and may leave marks on the cloth. An improved HPN cord comprises chlorosulphonated polyethylene which has a very tough coating and is temperature resistant. Such a cord-connecting structure is fully described in U.S. Pat. No. 3,665,374 of common assignment which is directed to a means to prevent breaking of the fine wires within the conductors. In a flatiron, it is customary to provide a point where the cord is tightly compressed between two parts, generally in the iron handle. Usually the conductors are attached to the internal terminals and laid against the handle and held by a coverplate with a shart-edged tongue that presses or "bites" into the cord as the cover is tightened into the handle housing. This squeezing of the cord between the parts relieves the terminals of stress applied by the cord. This is shown at tongue 22 in U.S. Pat. No. 3,665,374. At elevated iron temperatures and the pull that must be resisted, merely squeezing the parts is often insufficient to meet U.L. requirements. Also, when the cord is squeezed to meet the pull test, the copper conductors are often weakened so they break and similarly the insulation is sometimes damaged so the two conductors touch one another and short circuit. Other forms of stress relief use clamps 39 as shown in U.S. Pat. No. 2,727,322 or a strain relief plate 74 in U.S. Pat. No. 2,602,248, both of common assignment. These are extra parts that are individually manufactured, require manual labor to apply and so are more costly. An improved and simplified strain relief is desired that is usable with HPN cords of new material such as chlorosulphonated polyethylene and that meets stringent U.L. requirements.

SUMMARY OF THE INVENTION

Briefly described, the invention is directed to a strain relief for use in a portable electric appliance which has a cord having separated conductors connected to internal terminals through an improved strain relief connection between the cord and appliance. The connection comprises a generally U-shaped housing chamber in the appliance containing the conductors. The chamber has a central fastening hole with a substantially right angle step portion spanning the chamber generally through the fastening hole with the step having a length coextensive with all sides of the chamber. Cooperating with this is a chamber cover with a tongue extending toward and also coextensive with the step portion. The cover is secured through a protected recess, which means it is protected from entrance by person's finger, and in which a screw connects the cover to the housing hole to fasten it to the housing. The chamber and tongue may be formed with a curvature to nest in the secured position and the tongue performs multiple functions. It positions the conductors, placed merely to straddle the screw, in the chamber to bend them against the step anywhere along its length and automatically position them in proper strain relief; it extends over the cord entrance to block the external cord from entering the chamber; and it forms a guide means to limit the movement of the coverplate in one direction. The cover may also have a second tongue that cooperates with the housing to conventionally anchor a cord bushing to the appliance. Thus, the main object is to provide an improved strain relief connection between the cord and an electric appliance that uses only a single piece of molded phenolic; meets all U.L. requirements; and performs multi-functions with no extra parts.

BRIEF DESCRIPTION OF THE DRAWINGS

FIG. 1 is a partial perspective view of the heel portion of an iron handle where the strain relief is located;

FIG. 2 is a cross-sectional view on line 2—2 of FIG. 1 showing the assembled position;

FIG. 3 is an exploded partial perspective of an iron handle and coverplate showing internal structure; and FIG. 4 is a view from the bottom of the assembled parts of FIG. 3 with part of the coverplate broken to show internal structure.

DESCRIPTION OF THE PREFERRED EMBODIMENT

The invention is applicable to any cord-connected appliance regardless of the material used but is specifically applicable to an electric flatiron and, for convenience will be described in connection therewith. Also, it is applicable to plural conductor cords including those with a grounding conductor or the more common dual conductor cord and is so described in connection with the latter.

Referring first to FIGS. 1 and 2, there is shown an electric flatiron handle 10 from which the usual cord 12 extends protected by elongated flexible sleeve bushing 14 surrounding the cord and anchored to the appliance by formed lip 16 in a well-known manner. The cord extends out of the top of the handle at the rear for convenient use by a right-or left-handed operator although it can extend from the sides in a well-known manner and the invention is applicable to any such connection. After entering the handle, the cord has a portion generally separated into plural such as two conductors 12 and the individual conductors are connected to terminals 18 to supply power to the iron. Prior forms of stress relief have used suitable clamps or strain relief plates or just a plain toothed tongue to hold conductors 12 against longitudinal movement as shown in the U.S. Pat. No. 2,727,322, 2,602,248, and 3,665,374 patents respectively. In the latter patent, the toothed tongue portion 22 is provided on coverplate 20 that is tightened into handle 10 to hold the cords in strain relief position.

Newer materials, such a chlorosulphonated polyethylene or others with similar characteristics, are formed to be rippable and because of their toughness and heat resistance are finding use in appliances such as irons. New and different materials spawn new U.L. requirements and the invention herein is especially adapted for use with the tougher HPN coating such as chlorosulphonated polyethylene. A typical requirement in flatirons is that the strain relief must prevent a stress on the cord from being transmitted to the terminals when a force (35 pounds) is applied for one minute. Additionally, there are demanding supplementary insulation requirements related to temperature. Further, an attached flexible cord must not be able to be pushed into the enclosure of an appliance through the cord entry hole in a manner which will cause a ground or a short circuit. Then there is the requirement that molded parts, such as plastic, have to be constructed to have adequate mechanical strength and rigidity to withstand the stresses of actual service. These all put limits on the types of strain relief that may be used and the present invention is designed to meet all these requirements in a simple molded piece by the unique configuration and arrangement of parts.

As seen in FIG. 3, in order to contain the separated conductors there is provided a housing chamber generally indicated at 22 with a central fastening hole 24 which is nothing more than a threaded screw hole. The chamber, as intended herein and as shown, is in the housing at the entrance of the conductors into the iron handle and is relatively large compared to the conductors so the conductors have a lot of room to move around or be pushed or placed loosely in the chamber for a reason that will become apparent as opposed to carefully molded guide passages or channels into which the conductors have to be carefully placed and aligned. For a purpose to be explained, chamber 22 is generally U-shaped in the handle with a depth of several times the depth of the conductors as clearly seen in FIGS. 3 and 4 and is provided with step portion 26 that, as seen in FIG. 2, that is coextensive with and extends completely around the sides of the u and, is formed to create substantially a right angle to create a sharp bend in the conductors as will be apparent. The step portion spans the entire chamber adjacent fastening hole 24 meaning it substantially completely circumscribes the walls of the U of the chamber on the inside thereof in the handle 10 as seen in FIG. 3 and, for maximum force anc minimum stress, preferably extends through the fastening hole 24 or substantially straddles it as seen in FIG. 3. In order to close the chamber at the open end of the U and provide strain relief, chamber coverplate 20 has a tongue 28 that extends toward the chamber for insertion into it and is formed to be at least coextensive with step portion 26 so that it covers or abuts the complete step portion all along the inside of the chamber as seen in FIG. 4. Being a molded plastic, coverplate 20 may be provided with almost any desirable shape and can be molded with guide means 30 abutting overhang 32 to limit the upward movement of the coverplate when in position in the handle. Additionally, the parts may be tapered as shown in FIG. 1 so that a wedge-like action 34 provides for seating the parts accurately. The coverplate 20 may also have a second extending tongue 36 to cooperate with bushing 14 to complement the anchoring of the bushing by formed lips 16 in a known manner. In order to secure the coverplate to the housing, screw 38 is provided in the cover to engage hole 24 and pull the parts together. By locating the fastening hole 24 in alignment with step 26 and providing a bore 40 through tongue 28, maximum force is applied between the tongue 28 and step 26 because the parts are substantially aligned in a straight line. This avoids bending moments on the plastic with the possibility of breakage.

To avoid assembly problems, the ripped conductors 12 may be pushed or placed anywhere in chamber 22 and in any position straddling screw 38. No careful assembly is required —meaning they can be placed forward as at 12 at the left in FIG. 4 or against the back wall as shown at the right in FIG. 4. In other words, they do not have to be specifically placed or aligned in passages or channels for proper strain relief. The tongue and chamber cooperating walls may also be formed with a curvature to the general U-shaped as shown in FIG. 4 so that they wedge or nest when in their tightened position and the tongue more easily automatically positions the conductors in strain relief by distorting them against step 26 anywhere along its length on each side of screw 38 which physically holds the conductors apart so they cannot contact one another. This arrangement meets the U.L. requirement that is normally provided by supplementary insulation without the need for extra insulation. As shown in FIG. 2, tightening of coverplate 20 into housing 10 puts a right angle crimp in a straight line force on conductors 12 sufficient to meet the pull requirements for adequate strain relief.

In order to protect against shock, in the event the conductor insulation is broken, there is provided a recess 42 that is a deep recess and is designed to be at least as deep as one-half the diameter of the usual screw head as seen in FIG. 4 and is thus defined as a protected recess. The U.L. probe used to test the accessibility of the screw head in this installation is a round probe one-fourth inch in diameter and the deep recess and usual screw fastener has a head of smaller diameter and is therefore beyond the reach of one's finger. With this arrangement, even if the screw should be electrically hot, a user's finger could not contact the head because of the deep recess. Thus, the cords are well insulated from outside the appliance.

Additionally, the external cord must not be able to be pushed into the enclosure or chamber of the handle through the entry hole and this is prevented by the same tongue 28 which, as seen in FIGS. 2 and 4, completely blocks the cord from entering the chamber when the parts are assembled.

It will be seen that the present invention, by a simple single piece molding, provides the requirements of strain relief as well as many additional physical characteristics by the use of the strain relief structure. The conductors are physically held apart so that they cannot contact one another between the strain relief and the cord terminals so supplementary insulation is not required, the screw portion is recessed deep to prevent any electrical path to the outer surface of the appliance, tightening is aligned along a substantially straight line for maximum force between the tongue and the step where the conductors are clamped and this gives minimum stress on the molded coverplate to avoid moments of force and hold the cord firmly without damage, the advantages of supplementary insulation are provided without the need for extra insulation by physically separating the conductors, and a baffle is provided for complete blockage to any external cord from entering the chamber. All these advantages are present while providing for simple and automatic positioning of the conductors in strain relief by the assembler with no need for careful aligning of components.

While there has been shown a preferred form of the invention, obvious equivalent variations are possible in light of the above teachings. It is therefore to be understood that, within the scope of the appended claims, the invention may be practised otherwise than as specifically described, and the claims are intended to cover such equivalent variations.

I claim:

1. For use in a portable electric appliance cord-connected to internal terminals by a portion of the cord having separated conductors connected thereto, the improvement in a strain relief connection between the cord and appliance comprising, a housing chamber in the appliance at the entrance of the cord to the appliance and containing the conductors loosely therein, said chamber having a generally U-shap with a central fastening hole and a step portion spanning the chamber completely around the sides of the U adjacent the hole, a chamber cover having tongue means extending therefrom toward and coextensive with the step portion, a protected recess in said cover having means therein engaging said hole to secure the cover to the housing, whereby the separate loosely disposed conductors straddle the securing means anywhere in said U-shaped chamber and said tongue extends into said chamber and automatically positions the conductors in strain relief against the step portion anywhere along its length and also blocks the external cord from entering the chamber when the cover is tightened to said housing.

2. Apparatus as described in claim 1 wherein the means in said cover engaging said fastening hole extends through said tongue for maximum force between the tongue and step.

3. Apparatus as described in claim 2 wheren the sides of said chamber and tongue are formed with a curvature to nest in tightened position and place said conductors for distortion on the step.

4. Apparatus as described in claim 3 wherein the step in said chamber extends through the fastening hole and said tongue for aligned force on said housing, and guide means on said cover limiting movement in one direction.

5. Apparatus as described in claim 4 wherein said cover is secured to the housing by a screw and said recess is at least as deep as one-half the diameter of the head of said screw.

6. Apparatus as described in claim 5 wherein said step is formed to create substantially a right angle bend in said conductors when the cover is tightened to said housing.

7. Apparatus as described in claim 6 wherein said cord has an elongated flexible sleeve bushing surrounding said cord and anchored to the appliance, said cover having a second extending tongue cooperating with said bushing to complement the anchor to said appliance.

* * * * *